(12) United States Patent
Alexandrovich et al.

(10) Patent No.: US 7,187,447 B1
(45) Date of Patent: Mar. 6, 2007

(54) FABRY-PEROT STEPPED ETALON WITH IMPROVED TRANSMITTANCE CHARACTERISTICS

(75) Inventors: Michael Alexandrovich, Allentown, PA (US); Stephen O'Brien, Lower Macungie Township, Lehigh County, PA (US); Richard B. Bylsma, Allentown, PA (US)

(73) Assignee: Lucent Technologies Inc., Murry Hill, NJ (US)

( * ) Notice: Subject to any disclaimer, the term of this patent is extended or adjusted under 35 U.S.C. 154(b) by 0 days.

(21) Appl. No.: 09/538,754

(22) Filed: Mar. 30, 2000

(51) Int. Cl.
*G01B 9/02* (2006.01)

(52) U.S. Cl. .................................. 356/454; 356/519
(58) Field of Classification Search .............. 356/480, 356/454, 519
See application file for complete search history.

(56) References Cited

U.S. PATENT DOCUMENTS 6,323,987 B1 * 11/2001 Rinaudo et al. ............ 359/260
6,500,521 B2 * 12/2002 O'Brien ..................... 428/156

* cited by examiner

*Primary Examiner*—Hwa (Andrew) Lee

(57) ABSTRACT

A stepped etalon having a top surface and two bottom surfaces that are parallel to the top surface and are each positioned at different distances from the top surface. Each bottom surface has an edge, wherein the edges face one another and a sloping step is positioned between the two edges so that rays from a beam of light projected onto the top surface of the etalon strike the step at the Brewster angle and pass through the etalon without any light being reflected back therein.

16 Claims, 5 Drawing Sheets

FABRY-PEROT STEPPED ETALON WITH IMPROVED TRANSMITTANCE CHARACTERISTICS

FIELD OF THE INVENTION

The present invention relates to etalons, and more particularly to an improvement in the design of a stepped Fabry-Perot etalon that eliminates reflection.

BACKGROUND OF THE INVENTION

Stepped Fabry-Perot etalons are typically comprised of a body of transparent material having a top planar surface and two bottom planar surfaces that are parallel to the top surface but are positioned at different distances from the top surface so that there is a step between the two bottom surfaces. The bottom surface that is closer to the top surface is commonly referred to as the thin side and the bottom surface that is farther from the top surface is commonly referred to as the thick side. In determining the frequency of a beam of light projected onto the top surface, use is made of the transmittance functions of the top and bottom surfaces of the etalon.

In conventional etalons, the step between the two bottom surfaces is perpendicular to the surfaces, and reflections from the step back into the etalon are at a different angle than that of the original beam of light. Since the transmittance function of the etalon depends on the angle at which light impinges on the top and bottom surfaces of the etalon, the transmittance function for the original beam of light and the transmittance function for the light reflected from the step are different. Thus, the overall transmittance function is defined by the uncontrolled interference of the original and reflected light. The etalon characteristic of the stepped etalon becomes irregular. This effect occurs in the proximity of the step so as to make the area near the step unusable. This is an obstacle to the miniaturization of the etalon.

In an attempt to reduce this deleterious effect, random features have been formed on the step to scatter the light. Doing so helps to a degree because the more light scattered, the less light is reflected, but it does not solve the problem completely.

SUMMARY

In accordance with the present invention, reflections from the step of a Fabry-Perot stepped etalon are eliminated by forming the step at an angle with respect to the top and bottom surfaces such that light from the original beam passes through the step rather than being reflected back. The step is formed at an angle so that a beam of light strikes the step at the Brewster angle. To avoid any reflection, the light beam must be linearly polarized and collimated and the electric component vector of the light beam must be in the plane of incidence.

DETAILED DESCRIPTION OF THE INVENTION

Figure 1:
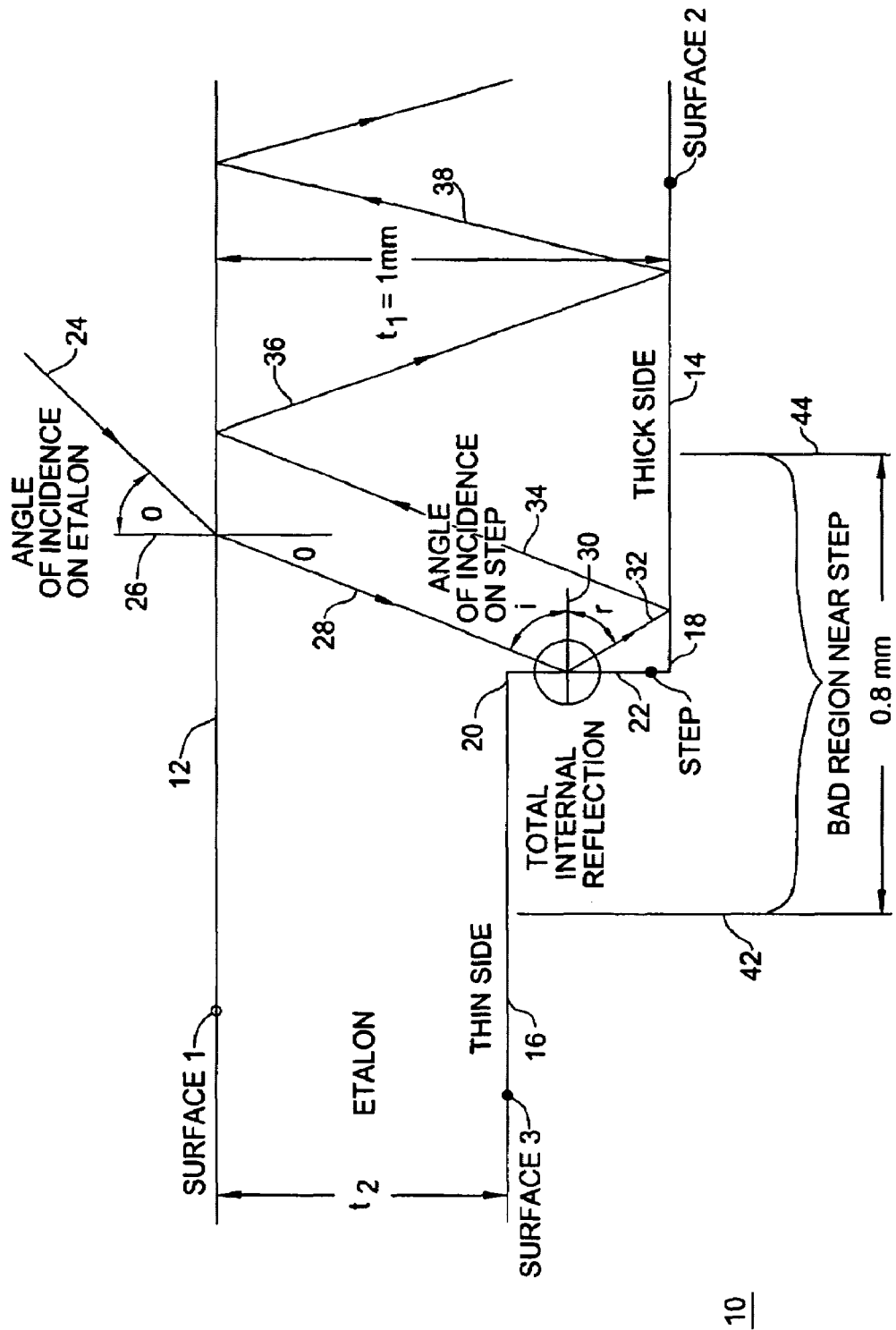
FIG. 1 shows a cross sectional view of a conventional etalon having a vertical step.

FIG. 1 shows a cross sectional view of a conventional etalon 10. Since the present invention incorporates elements in etalon 10, a detailed review of its operation will aid in understanding the teachings of the present invention. Etalon 10 is comprised of a top surface 12, a first bottom surface 14, the thick side, and a second bottom surface 16, the thin side. Top surface 12 and first and second bottom surfaces 14 and 16 are all parallel to one another. First bottom surface 14 is positioned at a distance $t_1$, herein shown by way of example to be 1.0 millimeter (mm) from top surface 12, and second bottom surface 16 is positioned at a distance $t_2$, herein shown by way of example to be 0.999910 mm from top surface 12. First and second bottom surfaces 14 and 16 each have an edge 18 and 20, respectively, that face one another. A step 22 lies between edges 18 and 20 and is perpendicular to both of them. Etalon 10 may be fabricated from glass, silicon or any other optical material.

A line 24 represents the path of the central ray of a beam of collimated linearly polarized light that is projected onto top surface 12 at an angle of incidence of θ with respect to a line 26 that is perpendicular to top surface 12. As a result of the difference in the speed of light in air outside of etalon 10 and the speed of light in etalon 10, the beam of light represented by line 24 is refracted so that it enters etalon 10 at an angle θ'. The beam of light then proceeds along a path 28 so as to strike step 22 at an angle of incidence i with respect to a line 30 that is perpendicular to step 22, and is then totally reflected at an angle of reflection r=i along path 32.

The beam of light is reflected from first bottom surface 14 along path 34 to top surface 12 so as to be reflected back and forth between top surface 12 and first bottom surface 14 as indicated by paths 36, 38 and 40. Other rays in the beam of light also strike step 22 and are reflected in a manner corresponding to that of the central ray just described. As a result of the reflections from step 22, light striking the bottom surfaces 14 or 16 within a region defined by the lines 42 and 44, herein shown by way of example to be 0.8 mm apart, introduces loss into the overall transmittance function of etalon 10.

Figure 2:
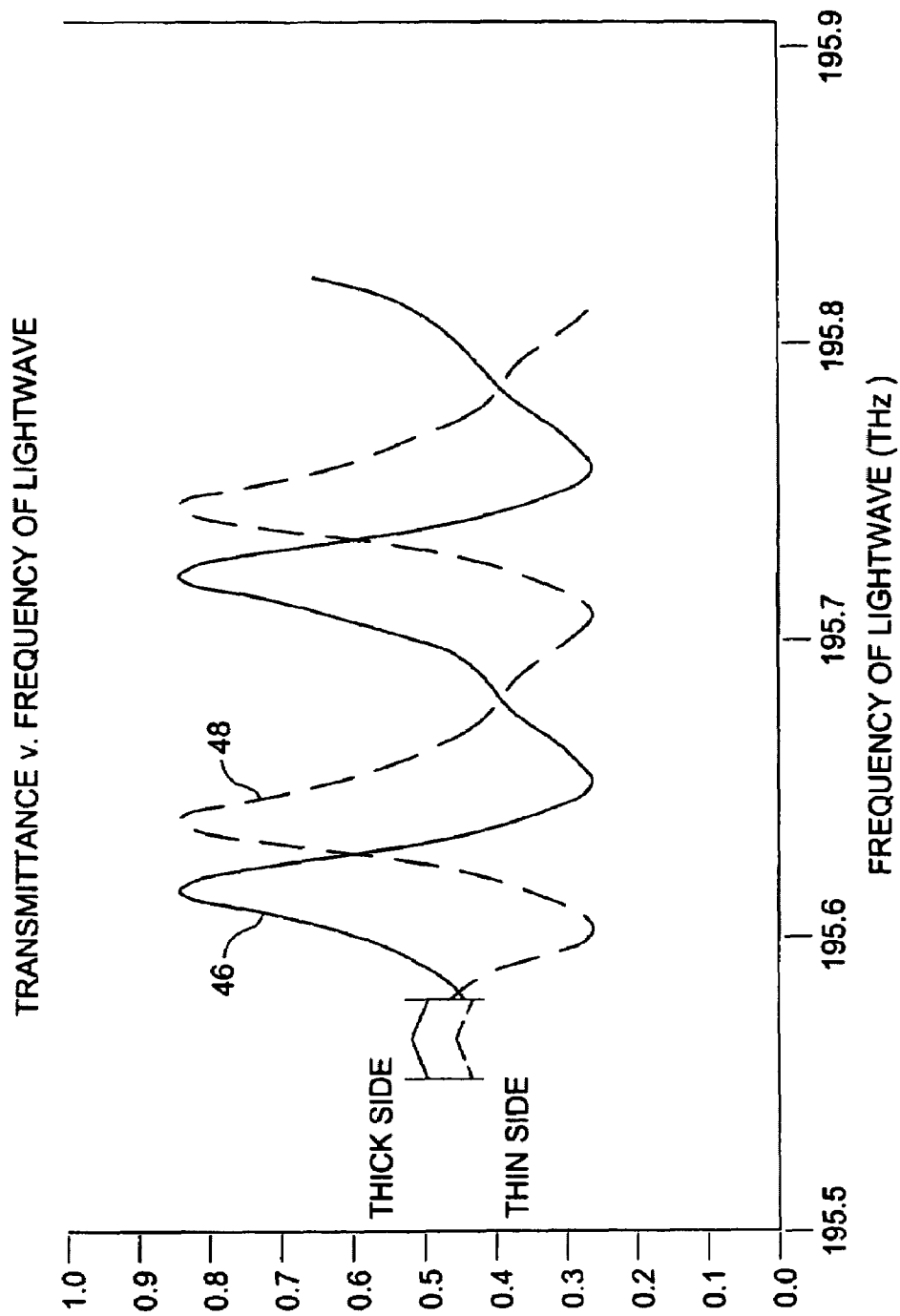
FIG. 2 shows a graph of the transmittance of light plotted as a function of the frequency of light in TerraHertz (THz) for both the thick and thin sides of the etalon shown in FIG. 1.

FIG. 2 shows a graph of the transmittance function of light plotted as a function of the frequency of light in THz for both first bottom surface 14 and second bottom surface 16 of etalon 10, wherein the transmittance function is represented by a scale of numbers from 0.0, denoting no transmittance of light through etalon 10, to 1.0, representing 100% transmittance of light through etalon 10. Curve 46 represents the transmittance function of first bottom surface 14, the thick side of etalon 10, and curve 48 represents the transmittance function of second bottom surface 16, the thin side, of etalon 10.

Figure 3:
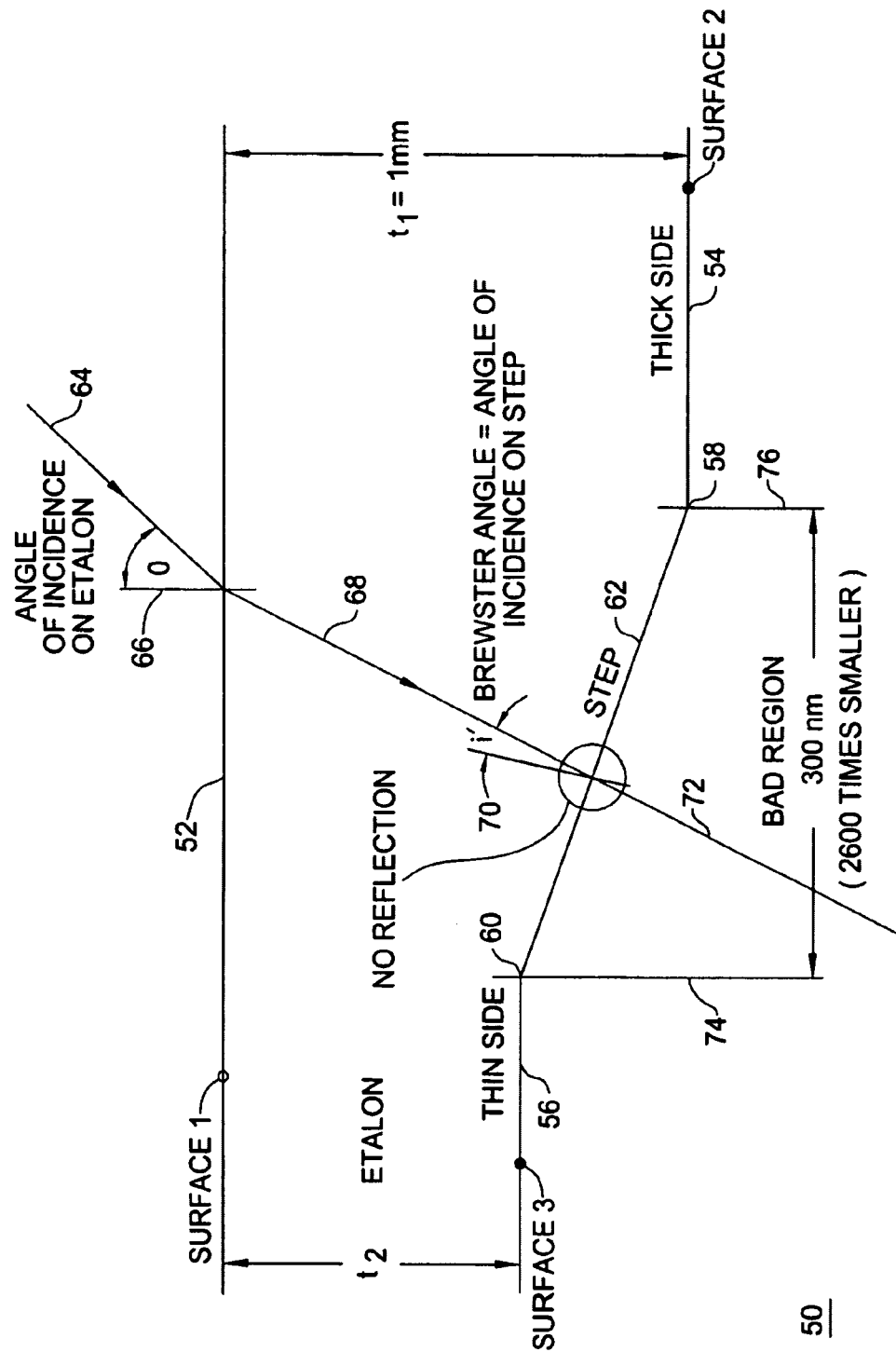
FIG. 3 shows a cross-sectional view of an exemplary embodiment of an etalon fabricated according to the present invention.

FIG. 3 shows a cross sectional view of an exemplary embodiment of an etalon 50 fabricated according to the present invention. Etalon 50 is comprised of a top surface 52, a first bottom surface 54, the thick side, and a second bottom surface 56, the thin side. Top surface 52 and first and second bottom surfaces 54 and 56 are all parallel to one another. First bottom surface 54 is positioned at a distance $t_1$, herein shown by way of example to be 1.0 mm, from top surface 52, and second bottom surface 56 is positioned at a distance $t_2$, herein shown by way of example to be 0.999910 mm, from top surface 52. First and second bottom surfaces 54 and 56 each have an edge 58 and 60, respectively, that face one another. In accordance with the present invention, a sloping step 62 is positioned between edges 58 and 60 so as to be at an angle other than 90° with respect to first and second bottom surfaces 54 and 56.

A line 64 represents the path of the central ray of a beam of collimated linearly polarized light that is projected onto top surface 52 at an angle of incidence θ with respect to a line 66 that is perpendicular to top surface 52. The beam of light represented by line 64 is refracted and enters etalon 50 at an angle θ' and then proceeds along a path 68 so as to strike sloping step 62 at an angle of incidence i' that is approximately equal to the Brewster angle with respect to a line 70 that is perpendicular to sloping step 62. The central ray of the beam of light then passes through sloping step 62 along a path 72.

Since the beam of light is collimated, all rays of light striking sloping step 62 will also pass through step 62 and will not be reflected back into etalon 50. The useless region of etalon 50 where reflections occur is positioned between lines 74 and 76, and given the particular dimensions of etalon 50, is approximately 300 nanometer (nm). Thus, the useless region of etalon 50 is 2600 times smaller than the useless region of conventional etalon 10 shown in FIG. 1 and described above.

The electric component vector of the collimated and linearly polarized beam of light represented by line 64 must be in the plane of incidence because only for such an orientation of the electric component vector will there no reflection at the Brewster angle of light back into etalon 50. Accordingly, an etalon designed according to the present invention can be fabricated to be smaller than conventional etalons.

Figure 4:
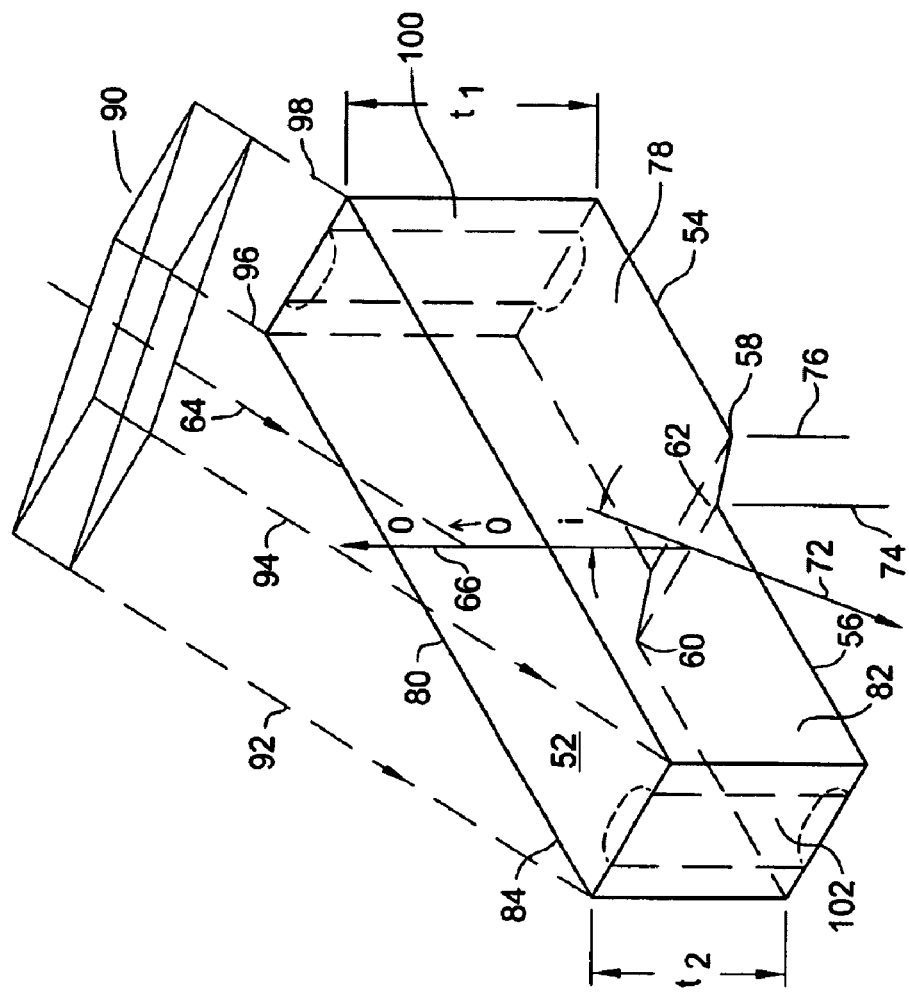
FIG. 4 shows a perspective view of the etalon shown in FIG. 3.
Figure 5:
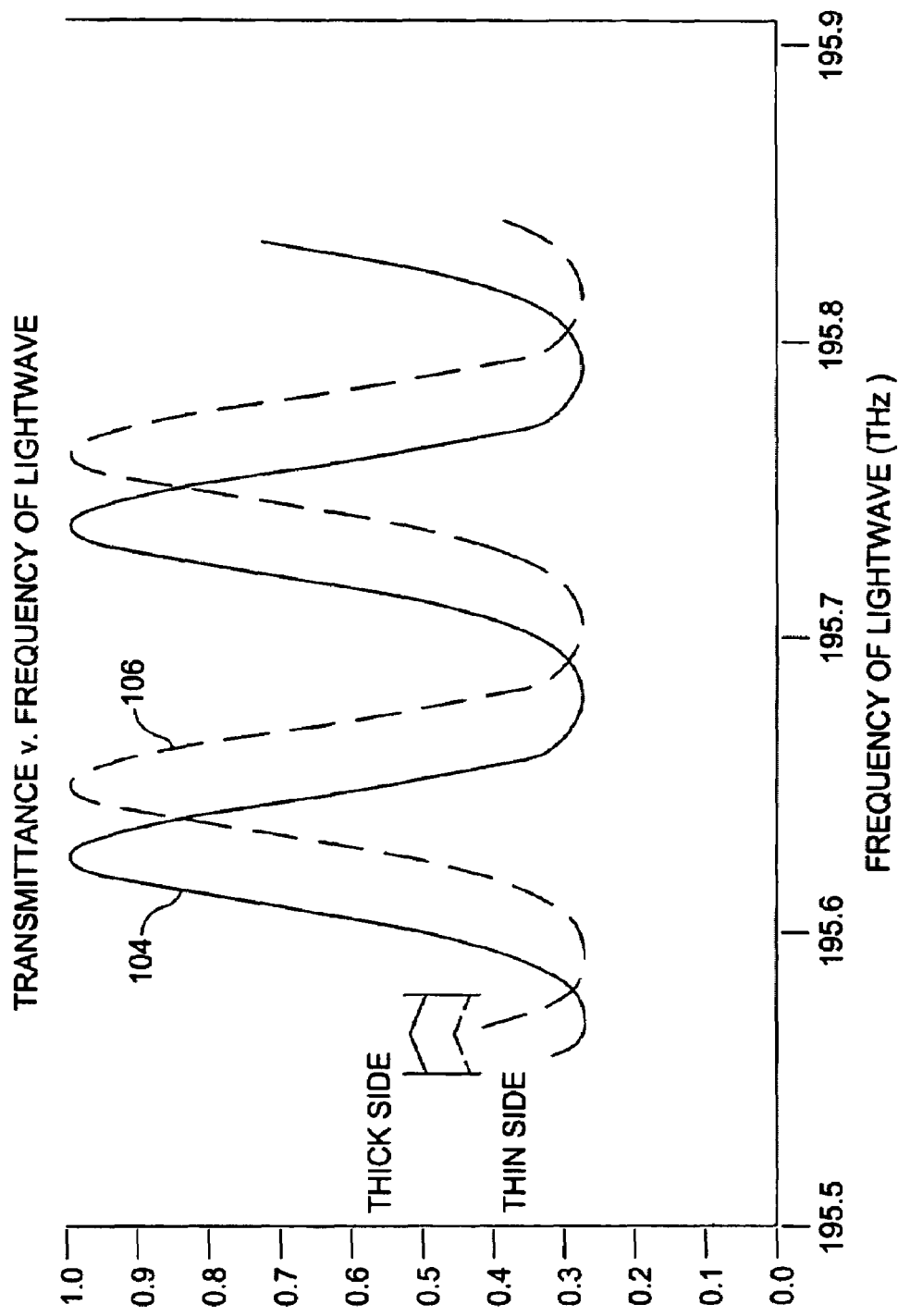
FIG. 5 shows a graph of the transmittance of light plotted as a function of the frequency of light in TerraHertz (THz) for both the thick and thin sides of the etalon fabricated according to the present invention and shown in FIGS. 3 and 4.

FIG. 4 shows a perspective view of etalon 50 shown in FIG. 3. Elements corresponding to those shown in FIG. 5 are numbered the same. As shown in FIG. 4, etalon 50 includes sides 78, 80, 82 and 84, and ends 86 and 88. Sides 78, 80, 82 and 84 are all coplanar.

Any suitable directing means, e.g., 90, can be used to project a linearly polarized beam of light within the dashed lines 92, 94, 96 and 98 onto top surface 52 with an angle of incidence of θ, wherein the electric component vector of the beam of light is in the plane of incidence. Although it is preferable to fabricate etalon 50 in the form of a solid block of material such as glass or silicon, it is possible to substitute air for certain sections of the material in which case top surface 52 and first and second bottom surfaces 54 and 56 would be mirrors that may be kept in position by attachment to suitable spacers 100 and 102.

FIG. 5 shows a graph of the transmittance function of light plotted as a function of the frequency of light in THz for both first bottom surface 54 and second bottom surface 56 of etalon 50. Curve 104 represents the transmittance function of first bottom surface 54, the thick side of etalon 50, and curve 106 represents the transmittance function of second bottom surface 56, the thin side, of etalon 50.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the embodiment may be varied without departing from the spirit of the invention, and the exclusive use of all modifications which come within the scope of the appended claims is reserved.

The invention claimed is:

1. A stepped etalon, comprising:
 a first planar reflecting surface;
 a second planar reflecting surface positioned parallel to and at a first distance from the first planar reflecting surface;
 a third planar reflecting surface positioned parallel to and at a second distance from the first planar reflecting surface, the second distance being greater than the first distance, the second planar reflecting surface having a first edge and the third planar reflecting surface having a second edge; and
 a step having a sloping planar surface, relative to the first planar reflecting surface, adjoining the first and second edges wherein the step is positioned such that a portion of a light passing through the first planar reflecting surface impinges on the sloping planar surface at an angle such that it passes through the sloping planar surface.

2. The stepped etalon according to claim 1, wherein the angle is the Brewster angle.

3. The stepped etalon according to claim 1, wherein the first distance between the first planar reflecting surface and the second planar reflecting surface is 1.0 mm, the second distance between the first planar reflecting surface and the third planar reflecting surface is 0.999910 mm, and a third distance between the first edge and the second edge is 300 nm.

4. The stepped etalon according to claim 1, wherein the first, second and third reflecting surfaces are each formed on a glass surface.

5. The stepped etalon according to claim 1, wherein the first, second and third reflecting surfaces are each formed on a silicon surface.

6. The stepped etalon according to claim 1, wherein the first, second and third reflecting surfaces are each formed on a respective one of a plurality of plates of glass, a first spacer being provided between a first plate of glass on which the first reflecting surface is formed and a second plate of glass on which the second reflecting surface is formed, and a second spacer being provided between the first plate of glass on which the first reflecting surface is formed and a third plate of glass on which the third reflecting surface is formed, whereby air is interposed between the first planar reflecting surface and the second and third planar reflecting surfaces.

7. An apparatus for measuring the frequency of light, comprising:
 a first planar reflecting surface;
 a second planar reflecting surface positioned parallel to and at a first distance from the first planar reflecting surface;
 a third planar reflecting surface positioned parallel to and at a second distance from the first planar reflecting surface, the second distance being less than the first distance, the second planar reflecting surface having a first edge and the third planar reflecting surface having a second edge, the first edge and the second edge facing one another;
 a planar transparent member mounted between the first and second edges so as to form a step; and
 a directing means for directing a collimated beam of a linearly polarized light wave onto the first planar reflecting surface, the electric component vector of the light wave impinges on the planar transparent member at the Brewster angle such that the light wave propagates through the planar transparent member without any light being reflected from the step back into the etalon and interfering with a frequency measurement.

8. The apparatus according to claim 7, wherein the first, second and third planar reflecting surfaces and the step are each formed on a glass member.

9. The apparatus according to claim 7, wherein the first, second and third planar reflecting surfaces and the step are each formed on a silicon member.

10. The apparatus according to claim 7, wherein air is interposed between the first planar reflecting surface and the second and third planar reflecting surfaces and between the first planar reflecting surface and the step.

11. The apparatus according to claim 7, wherein the first distance between the first planar reflecting surface and the second planar reflecting surface is 1.0 mm, the second distance between the first planar reflecting surface and the third planar reflecting surface is 0.999910 mm, and a third distance between the first and second edges is 300 nm.

12. An etalon, comprised of:
a solid transparent elongated member having a first end and a second end, the first end and the second end being oppositely disposed to one another, the first end having a rectangular cross-section with a top surface, a side surface and a bottom surface, the second end having a rectangular cross-section with a top surface, a side surface and a bottom surface, the top surface of the first and second ends being coplanar, the side surfaces of the first and second ends being coplanar, the bottom surface of the first end being farther from its top surface than the bottom surface of the second end is from its top surface, the bottom surfaces of the first and second ends being rectangular-shaped, the bottom surface of the first end having a first edge and the bottom surface of the second end having a second edge, the first edge and the second edge facing one another;
a planar step joined to the first and second edges;
projecting means for projecting a beam of collimated linearly polarized light waves onto the top surface of the etalon with the electric component vector of the light waves in the plane of incidence, the planar step having a slope with respect to the top surfaces of the first and second ends that is at the Brewster angle with respect to the light waves passing through the elongated member, whereby the small portion of the light waves impinging on the step pass through the step and are not reflected back into the interior of the solid transparent elongated member, thereby avoiding interfering with a measurement of a frequency of the light waves; and
semi-reflecting surfaces formed on the tops and bottoms of the first and second ends and on the planar step.

13. The etalon according to claim 12, wherein the first and second ends of the solid transparent elongated member are each fabricated from glass.

14. The etalon according to claim 12, wherein the first and second ends of the solid transparent elongated member are each fabricated from silicon.

15. The etalon according to claim 12, wherein some of the light projected onto the top surfaces of the first and second ends reaches the planar step at the Brewster angle.

16. The etalon according to claim 12, wherein a first distance between the top and bottom surfaces of the first end is 1.0 mm, a second distance between the top and bottom surfaces of the second end is 0.999910 mm, and a third distance between the first and second edges is 300 nm.

* * * * *